United States Patent

Billeter

[11] 4,132,388
[45] Jan. 2, 1979

[54] ANGLE COCK

[75] Inventor: Henry R. Billeter, Marco Island, Fla.

[73] Assignee: Sloan Valve Company, Franklin Park, Ill.

[21] Appl. No.: 815,995

[22] Filed: Jul. 15, 1977

[51] Int. Cl.² .............................................. F16K 25/00
[52] U.S. Cl. ................................... 251/175; 251/192; 251/312
[58] Field of Search .................. 251/175, 192, 312

[56] References Cited

U.S. PATENT DOCUMENTS

| 2,505,270 | 4/1950 | Allen | 251/175 |
| 3,103,948 | 9/1963 | Salmen | 251/175 X |
| 3,301,271 | 1/1967 | Burke | 251/175 X |
| 3,360,236 | 12/1967 | Hulslander | 251/175 X |
| 3,497,179 | 2/1970 | Smyers | 251/175 |

Primary Examiner—Harold W. Weakley
Attorney, Agent, or Firm—Kinzer, Plyer, Dorn & McEachran

[57] ABSTRACT

An angle cock having a rotatable cylindrical plug valve carrying a plurality of sealing members each fitted within a double recess on the periphery of the plug. A sealing member is urged by air pressure into a sealing position when the angle cock is in the closed position.

4 Claims, 5 Drawing Figures

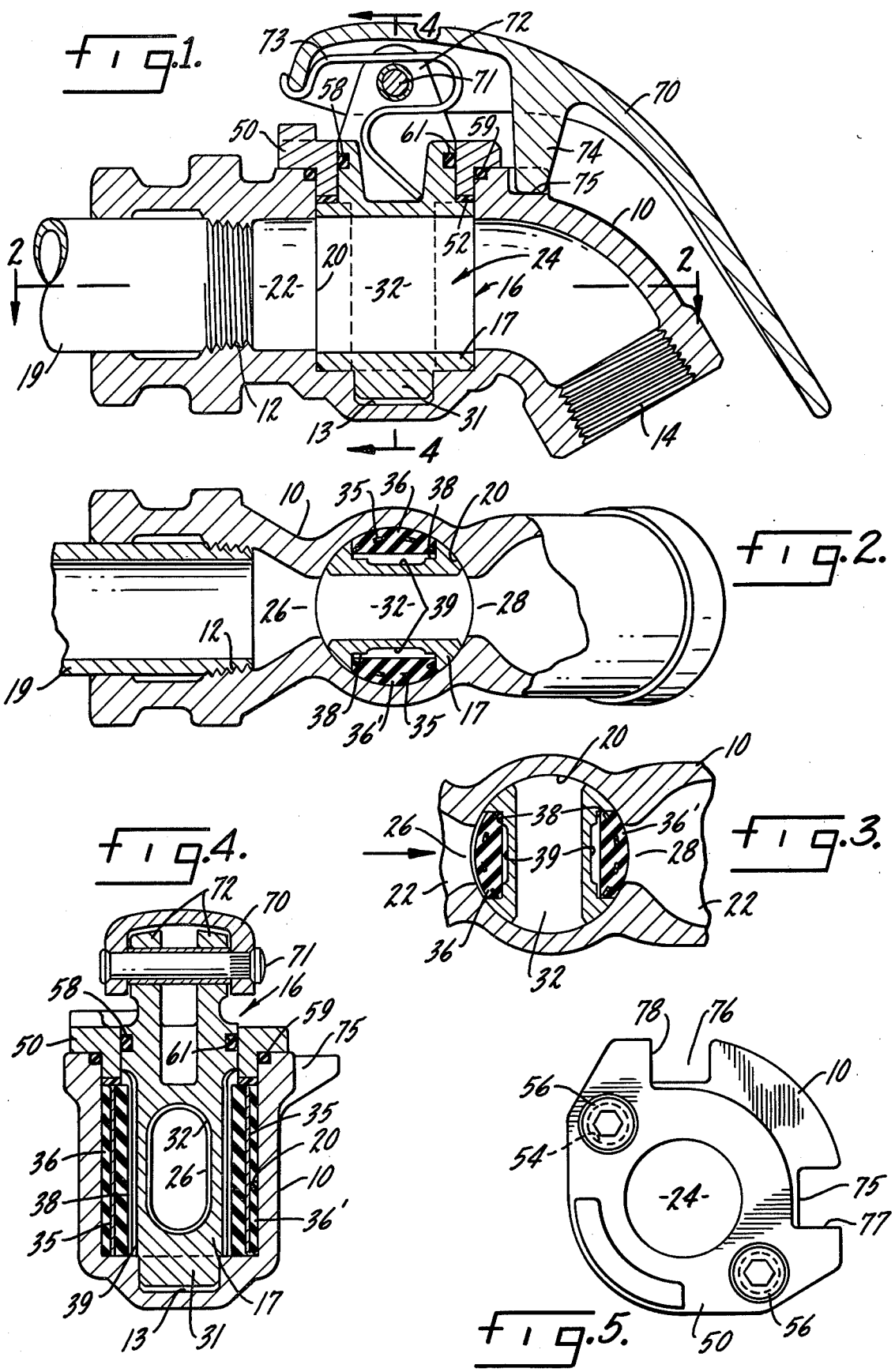

ANGLE COCK

SUMMARY OF THE INVENTION

This invention relates in general to valves but more particularly to an angle cock or valve for controlling air pressure passing through the brake pipe on railway trains.

It is an object of this invention to provide an improved angle cock which can be easily repaired or reconditioned with a minimum of skill and equipment. Such an angle cock, in addition to being economical to manufacture and assemble, permits simple and quick replacement of parts in the field without removing the angle cock from the railway car or disturbing the pipe connections thereto.

A purpose of this invention is to provide an angle cock with interchangeable seals, whereby a worn seal can be replaced by the other, thereby allowing an emergency repair when replacement seals are unavailable.

A feature of this invention is to provide a reduced friction angle cock by having a nylon thrust washer between the rotatable valve plug and the locking bonnet.

It is another feature of this invention that air pressure may be bled from the air line without a need for critical handle movement to avoid a substantial loss of air or activation of the emergency brakes.

Other objects and advantages of the invention become more apparent in the following specifications, drawings and claims.

BRIEF DESCRIPTION OF THE DRAWINGS

The invention is illustrated in the drawings wherein:

FIG. 1 is an axial section of the angle cock;

FIG. 2 is a cross-sectional top view taken along the line 2—2 of FIG. 1 showing the valve plug in the open position;

FIG. 3 is a partial cross-sectional top view showing the valve plug rotated to the closed position;

FIG. 4 is a cross-sectional side view taken along the line 4—4 of FIG. 1; and

FIG. 5 is a top view of the bonnet and a portion of the valve body.

DESCRIPTION OF THE PREFERRED EMBODIMENT

The angle cock or valve comprises generally a body portion 10 having threaded inlet end 12 and a threaded outlet 14 with a cylindrical plug valve member indicated generally at 16 in FIG. 1. The outlet connects with the usual flexible hose connection between two railway cars while the inlet 12 connects with the rigid air pipe 19 extending throughout the length of the railway car.

Between inlet 12 and outlet 14 is flow passage 22 extending transversely through body 10. Within body 10 is a vertically disposed bore 20 forming a cylindrical valve chamber 24. Flow passage 22 communicates with chamber 24 through oblong openings 26 and 28 as best seen in FIG. 2.

The valve unit indicated generally at 16 and more specifically in FIG. 4 consists of a single unitary structure inserted into bore 20 of the valve body 10, the bottom end 31 being journaled in the body recess 13. The valve unit 16 has a cylindrical shaped plug portion 17 with passage 32 therethrough which is rotatable in bore 20 for controlling the passage of air through the valve body.

In the peripheral surface of valve plug 17 are two longitudinally extending recesses 38 parallel to the axis of bore 20. Recesses 38 are rectangular in shape and extend the entire length of plug 17. Centered within and parallel to recess 38 is a second narrower recess or channel 39 extending the length of recess 38 and continuing a relatively small distance into the neck of valve unit 16. Fitted within recesses 38 and slidable inwardly and outwardly therein, are flexible sealing members 36, 36' generally rectangular in shape except for an arcuate shaped sealing face conforming to the inner surface of valve chamber bore 20. Molded within seals 36, 36' to provide rigidity is metal backing 35. With the seals positioned in recesses 38, an air space is created by each channel 39 between plug 17 and each of the seals.

The bonnet 50 of the plug unit closes the top opening of bore 20, while O-ring 50 set in recess 61 in plug unit 16, and O-ring 59 prevent leakage outward through the valve body. A nylon thrust washer 52 may also be provided between the plug 17 and body 10 to reduce friction when plug 17 is rotated. The bonnet 50 is mounted to body 10 by bolts 56 extending through holes 54 and threaded into the body.

The handle 70 for opening and closing the valve is arranged for up and down movement about pin 71 journaled in a pair of upstanding lugs 72 formed at the top of the valve structure 16.

A leaf spring 73 normally biases the handle to the down position of FIG. 1. The valve handle 70 is locked in the valve open position by a lug 74 formed under the handle and resting in an opening 75 between the bonnet 50 and valve body 10 (FIG. 5). To close the valve the handle 70 is tilted upward against the tension of spring 73, then rotated 90 degrees counterclockwise, and when the handle is released, the handle lug 74 drops into opening 76 between body 10 and bonnet 50. Spring 73 holds handle 70 positively locked in any of its positions against vibration or shocks produced under service conditions, while stops 77 and 78 formed on the valve body limit rotation of the handle 70 within the 90 degree movement.

In now considering the operation of the angle cock, it will be assumed that conduit 19 is charged with air under pressure, and as shown in FIG. 3, plug 17 is in the cut-off position. The pressurized air flows from conduit 19 through passage 22 and opening 26 and acts upon the arcuate face of sealing member 36. Since the air pressure acting against the rear of seal 36 is atmospheric or in any event less than the inlet pressure, the air from passage 22 will force seal 36 back against recessed surface 38 allowing air to pass between the inner walls of chamber 24 and the edges of seal 36. The charged air will continue to pass around the top, bottom and side surfaces of plug 17 and reach the recessed channel 39 behind sealing member 36'. As the air enters channel 39 it acts upon the back of seal 36' urging the arcuate face of seal 36' to seat against the inner walls of chamber 24, positively sealing passage 22 at opening 28.

At times it will be the case that the charged air will be entering from the outlet side rather than the inlet. In such an instance the sealing operation will occur in reverse of that described above, causing seal 36, rather than seal 36', to effectively seal passage 22.

It is noted that since there is no metal to metal sealing of openings 26 and 28, the diameter of plug 17 can be smaller than the diameter of bore 20 without effecting the sealing operation. It has been found that the reduced diameter of the plug not only results in less critical machining but also prevents the plug surface from scratching the seal seating area in bore 20.

A feature of this angle cock is that when seals 36 or 36' become worn they can be easily replaced by simply removing valve member 16 and inserting a new seal in place of the defective seal. In an emergency situation however, it may be that a replacement seal is not available. Since only one of the seals is active in sealing flow passage 22, a repair can still be made in such situations. For explanatory purposes, assume that seal 36' is defective and it is necessary to seal off air pressure entering from the inlet side. To accomplish an emergency repair, defective seal 36' is removed and replaced with seal 36 so that a functioning seal is provided at the outlet side. When a new sealing member available it may be inserted in the recess formerly occupied by seal 36 to complete the repair.

Another advantage of the invention occurs in the manual braking of the railway cars. Often freight cars are uncoupled individually or in small groups and pushed or rolled a short distance to a desired location for loading or unloading. Upon reaching the location it is necessary to stop the car by manually opening the angle cock valve to exhaust air, thereby controlling the release of air from the reservoir to apply the brakes. Since the air exhausted from the supply line and reservoir will eventually have to be replaced, it is desirable that only a limited quantity of air sufficient to stop the car be released. In addition to conserving air pressure, a limited exhausting allows the railway car to be gradually slowed and stopped at the desired location instead of the abrupt emergency stopping associated with a rapid and complete exhausting.

In prior angle cocks it was necessary to critically control the handle movement between the closed and open position to stop the car without substantially draining the car's air reservoir.

As previously noted, in the present angle cock the valve plug 16 is smaller in diameter than bore 20. It can be seen in FIG. 3 that as the valve is rotated from the closed position, the air is restricted between plug 17 and bore 20 but still is allowed to slowly bleed from the line. A rapid exhaust is not permitted until plug passage 32 is rotated to communicate with opening 28. The rotational angle allowing restricted bleeding is sufficient so as not to require any critical positioning of the handle to obtain this mode.

As a modification of the angle cock, a recess may appear on the rear side of sealing members 36, 36' and extend the length of the seal. This recess in the seal provides an air space, and thus eliminates the need for channel 39.

It can thus been seen that this invention provides a novel angle cock employing air pressure acting behind the seal to close the air passage. A nylon thrust washer reduces friction in the rotation of the valve plug, while the reduced diameter of the plug provides means for effecting a restricted bleeding of air pressure without critical handle movement. The angle cock has also been shown to be easy to manufacture, assemble and repair and represents a significant advance in the art.

Whereas the preferred form of the invention has been shown and described herein, it should be realized that there may be many modifications, substitutions and alterations thereto.

The embodiments of the invention in which an exclusive property or privilege is claimed are defined as follows:

1. In an angle cock, a body having an air inlet and an air outlet, and a flow passage through said body connecting said inlet and outlet,
   a valve chamber in said body, a rotatable valve plug in said valve chamber for opening and closing said passage, said valve plug having a passage therein in alignment with said body passage in the open position of said plug, said valve plug having a neck portion,
   a pair of recesses formed on opposite sides of said valve plug, a sealing member fitted in each of said recesses and inwardly and outwardly slidable therein, and an arcuate shaped outer face on each sealing member.
   said plug having a channel extending along the entire length of the inward surface of each recess and continuing into said neck portion of said valve plug, to provide an air space behind said sealing member whereby when said plug is rotated to the closed position air passing into said channels and said recess on the outlet side of said passage forces a sealing member from its resting position in said recess into engagement with the chamber walls to close said valve passage.

2. The angle cock as claimed in claim 1 in which there is a metal backing plate in each sealing member.

3. In an angle cock, a body having an inlet and an outlet flow passage therethrough, a bore forming a cylindrical valve chamber in said body, a rotatable cylindrical valve plug in said valve chamber for opening and closing said passage, said valve plug having a passage therein in alignment with said body passage in the open position of said plug,
   a pair of recesses formed on opposite sides of said valve plug, a channel formed in the bottom of each recess, said channel extending the entire length of said recess and continuing into the neck portion of said valve plug, a sealing member fitted in each of said recesses and inwardly and outwardly slidable therein, said sealing members conforming to the shape of said recess on the sides and rear surfaces thereof, and an arcuate shaped outer face on said sealing members, whereby when said plug is rotated to the closed position air passing into the channel on the outlet side of said passage forces said sealing member from its resting position in said recess into engagement with the chamber walls to close said valve passage,
   said valve plug being slightly smaller in diameter than said bore so that a restricted passageway between said plug and said bore communicates said inlet with outlet when said plug is rotated to a position between said closed and open positions.

4. The angle cock as claimed in claim 3 in which the plug is rotated 90 degrees from said closed to said open position and said restricted passageway communicates said inlet with said outlet over approximately 30 degrees of the 90 degree movement, whereby said valve plug can be positioned in said restricted passage mode without criticial handle movement.

* * * * *